US007641787B2

(12) United States Patent
Yaluris et al.

(10) Patent No.: US 7,641,787 B2
(45) Date of Patent: Jan. 5, 2010

(54) COMPOSITIONS AND PROCESSES FOR REDUCING $NO_x$ EMISSIONS DURING FLUID CATALYTIC CRACKING (75) Inventors: George Yaluris, Columbia, MD (US); Michael Scott Ziebarth, Columbia, MD (US); Xinjin Zhao, Woodbine, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 12/291,379

(22) Filed: Nov. 7, 2008

(65) Prior Publication Data

US 2009/0068079 A1   Mar. 12, 2009

Related U.S. Application Data

(63) Continuation of application No. 10/909,709, filed on Aug. 2, 2004, now abandoned, which is a continuation-in-part of application No. 10/824,913, filed on Apr. 15, 2004, now Pat. No. 7,304,011.

(51) Int. Cl.
*C10G 11/05* (2006.01)
*C10G 47/16* (2006.01)
*C10G 47/18* (2006.01)
*C10G 47/20* (2006.01)
*B01J 29/90* (2006.01)

(52) U.S. Cl. ............... 208/119; 208/110; 208/111.01; 208/111.05; 208/111.1; 208/111.15; 208/111.2; 208/111.25; 208/111.3; 208/111.35; 208/120.01; 208/120.05; 208/120.1; 208/120.15; 208/120.2; 208/120.25; 208/120.3; 208/120.35; 502/65; 502/66; 502/67; 502/68; 502/73; 502/74; 502/77; 502/78; 502/79

(58) Field of Classification Search ............... 502/65, 502/66, 67, 68, 73, 74, 77, 78, 79; 208/110, 208/111.01, 111.05, 111.1, 111.15, 111.2, 208/111.25, 111.3, 111.35, 119, 120.01, 208/120.05, 120.1, 120.15, 120.2, 120.25, 208/120.3, 120.35

See application file for complete search history.

(56) References Cited

U.S. PATENT DOCUMENTS

| | | | |
|---|---|---|---|
| 2,892,801 A | 6/1959 | Sargent | 252/474 |
| 3,036,973 A | 5/1962 | Nathan et al. | 252/474 |
| 3,129,252 A | 4/1964 | Graham et al. | 260/637 |
| 3,184,417 A | 5/1965 | Hort | 252/474 |
| 3,364,136 A | 1/1968 | Chen et al. | 208/120 |
| 3,617,488 A | 11/1971 | Csicsery | 208/59 |
| 3,634,140 A | 1/1972 | Krusenstierna | 136/86 |
| 3,894,940 A | 7/1975 | Scherzer et al. | 208/120 |
| 4,199,435 A | 4/1980 | Chessmore et al. | 208/113 |
| 4,290,878 A | 9/1981 | Blanton, Jr. | 208/120 |
| 4,428,827 A | 1/1984 | Hobbs et al. | 208/120 |
| 4,434,147 A | 2/1984 | Dimpfl et al. | 423/235 |
| 4,469,589 A | 9/1984 | Yoo et al. | 208/120 |
| 4,471,070 A | 9/1984 | Siefert et al. | 502/302 |
| 4,472,267 A | 9/1984 | Yoo et al. | 208/120 |
| 4,472,532 A | 9/1984 | Mooi | 502/302 |
| 4,476,245 A | 10/1984 | Siefert | 502/302 |
| 4,495,304 A | 1/1985 | Yoo et al. | 502/66 |
| 4,495,305 A | 1/1985 | Yoo et al. | 502/65 |
| 4,513,091 A | 4/1985 | Chang et al. | 502/71 |
| 4,521,298 A | 6/1985 | Rosinski et al. | 206/120 |
| 4,522,937 A | 6/1985 | Yoo et al. | 502/302 |
| 4,582,815 A | 4/1986 | Bowes | 502/64 |
| 4,642,178 A | 2/1987 | Yoo et al. | 208/113 |
| 4,654,316 A | 3/1987 | Barri et al. | 502/61 |
| 4,708,786 A | 11/1987 | Occelli | 208/120 |
| 4,728,635 A | 3/1988 | Bhattacharyya | 502/304 |
| 4,735,927 A | 4/1988 | Gerdes | 502/64 |
| 4,747,935 A | 5/1988 | Scherzer | 208/120 |
| 4,758,418 A | 7/1988 | Yoo et al. | 423/244 |
| 4,778,664 A | 10/1988 | Grinstead | 423/235 |
| 4,790,982 A | 12/1988 | Yoo et al. | 423/239 |
| 4,797,266 A | 1/1989 | Evans | 423/328 |
| 4,798,813 A | 1/1989 | Kato | 502/60 |
| 4,810,369 A | 3/1989 | Scherzer | 208/120 |
| 4,812,430 A | 3/1989 | Child | 502/42 |
| 4,812,431 A | 3/1989 | Child | 502/42 |
| 4,818,509 A | 4/1989 | Dwyer et al. | 423/329 |
| 4,826,799 A | 5/1989 | Cheng et al. | 502/301 |
| 4,830,840 A | 5/1989 | Bhattacharyya | 423/239 |
| 4,853,203 A | 8/1989 | Guth et al. | 423/328 |
| 4,855,115 A | 8/1989 | Imanari | 423/239 |
| 4,880,521 A * | 11/1989 | Scherzer | 208/120.15 |
| 4,889,615 A | 12/1989 | Chin et al. | 208/113 |
| 4,895,994 A | 1/1990 | Cheng et al. | 585/270 |
| 4,898,662 A * | 2/1990 | Chu et al. | 206/120.15 |
| 4,898,846 A | 2/1990 | Edwards et al. | 502/67 |

(Continued)

FOREIGN PATENT DOCUMENTS

WO    03/045547    6/2003

(Continued)

*Primary Examiner*—David M Brunsman
(74) *Attorney, Agent, or Firm*—Charles A. Cross; Beverly J. Artale (57) ABSTRACT

Compositions for reduction of $NO_x$ generated during a catalytic cracking process, preferably, a fluid catalytic cracking process, are disclosed. The compositions comprise a fluid catalytic cracking catalyst composition, preferably containing a Y-type zeolite, and a particulate $NO_x$ composition containing particles of a zeolite having a pore size ranging from about 3 to about 7.2 Angstroms and a $SiO_2$ to $Al_2O_3$ molar ratio of less than about 500. Preferably, the $NO_x$ reduction composition contains $NO_x$ reduction zeolite particles bound with an inorganic binder. In the alternative, the $NO_x$ reduction zeolite particles are incorporated into the cracking catalyst as an integral component of the catalyst. Compositions in accordance with the invention are very effective for the reduction of $NO_x$ emissions released from the regenerator of a fluid catalytic cracking unit operating under FCC process conditions without a substantial change in conversion or yield of cracked products. Processes for the use of the compositions are also disclosed.

54 Claims, 1 Drawing Sheet

U.S. PATENT DOCUMENTS

| | | | | |
|---|---|---|---|---|
| 4,904,627 | A | 2/1990 | Bhattacharyya | 502/63 |
| 4,946,581 | A | 8/1990 | van Broekhoven | 208/120 |
| 4,952,382 | A | 8/1990 | van Broekhoven | 423/244 |
| 4,957,718 | A | 9/1990 | Yoo et al. | 423/244 |
| 4,957,892 | A | 9/1990 | Yoo et al. | 502/63 |
| 4,963,520 | A | 10/1990 | Yoo et al. | 502/64 |
| 4,973,399 | A * | 11/1990 | Green et al. | 208/120.1 |
| 4,976,847 | A | 12/1990 | Maxwell et al. | 208/120 |
| 4,980,052 | A | 12/1990 | Green et al. | 208/120 |
| 4,985,384 | A * | 1/1991 | Gilson | 502/61 |
| 4,988,432 | A | 1/1991 | Chin | 208/121 |
| 4,988,654 | A | 1/1991 | Kennedy et al. | 502/84 |
| 5,002,653 | A | 3/1991 | Kennedy et al. | 208/118 |
| 5,002,654 | A | 3/1991 | Chin | 208/121 |
| 5,017,538 | A | 5/1991 | Takeshima | 502/64 |
| 5,037,538 | A | 8/1991 | Chin et al. | 208/113 |
| 5,041,272 | A | 8/1991 | Tamura et al. | 423/239 |
| 5,069,776 | A | 12/1991 | Biswas et al. | 208/120 |
| 5,102,530 | A | 4/1992 | Edwards et al. | 208/120 |
| 5,114,691 | A | 5/1992 | Pinnavaia et al. | 423/244 |
| 5,114,898 | A | 5/1992 | Pinnavaia et al. | 502/406 |
| 5,130,012 | A | 7/1992 | Edwards et al. | 208/113 |
| 5,145,815 | A | 9/1992 | Zarchy | 502/52 |
| 5,171,553 | A | 12/1992 | Li et al. | 423/239 |
| 5,173,278 | A | 12/1992 | Marler | 423/239 |
| 5,174,980 | A | 12/1992 | Hellring et al. | 423/706 |
| 5,190,736 | A | 3/1993 | Hellring et al. | 423/706 |
| 5,206,196 | A | 4/1993 | Nakano et al. | 502/73 |
| 5,208,198 | A | 5/1993 | Nakano et al. | 502/74 |
| 5,236,877 | A * | 8/1993 | Gatte | 502/67 |
| 5,240,690 | A | 8/1993 | Tang | 423/236 |
| 5,260,043 | A | 11/1993 | Li | 423/239.2 |
| 5,260,240 | A | 11/1993 | Guthrie et al. | 502/41 |
| 5,268,089 | A | 12/1993 | Avidan et al. | 208/113 |
| 5,270,024 | A | 12/1993 | Kasahara | 423/213.2 |
| 5,286,693 | A | 2/1994 | Ino et al. | 502/68 |
| 5,294,332 | A | 3/1994 | Klotz | 208/120 |
| 5,320,822 | A | 6/1994 | Ozin et al. | 423/700 |
| 5,364,517 | A | 11/1994 | Dieckmann et al. | 208/121 |
| 5,371,055 | A | 12/1994 | Cormier et al. | 502/65 |
| 5,372,706 | A | 12/1994 | Buchanan et al. | 208/113 |
| 5,374,409 | A | 12/1994 | Kasahara | 423/213.2 |
| 5,374,410 | A | 12/1994 | Grasselli et al. | 423/239 |
| 5,382,352 | A | 1/1995 | Hansen et al. | 208/121 |
| 5,413,699 | A | 5/1995 | Chou | 208/113 |
| 5,413,977 | A | 5/1995 | Occelli | 502/68 |
| 5,422,333 | A | 6/1995 | Kano et al. | 502/60 |
| 5,427,989 | A | 6/1995 | Kanesaka | 502/66 |
| 5,433,933 | A | 7/1995 | Eshita et al. | 423/213.2 |
| 5,443,803 | A | 8/1995 | Mizuno | 423/213.2 |
| 5,472,677 | A | 12/1995 | Farris et al. | 423/239 |
| 5,503,818 | A | 4/1996 | Nicolaides et al. | 423/327.1 |
| 5,510,306 | A | 4/1996 | Murray | 502/64 |
| 5,536,687 | A * | 7/1996 | Ward | 502/67 |
| 5,543,125 | A | 8/1996 | Uchida | 423/239.2 |
| 5,547,648 | A | 8/1996 | Buchanan et al. | 423/210 |
| 5,565,181 | A | 10/1996 | Dieckmann et al. | 423/239.1 |
| 5,599,520 | A | 2/1997 | Garces et al. | 423/700 |
| 5,614,453 | A | 3/1997 | Occelli | 502/86 |
| 5,627,125 | A | 5/1997 | Ebner et al. | 502/331 |
| 5,695,728 | A | 12/1997 | Miura | 423/238.2 |
| 5,705,053 | A | 1/1998 | Buchanan | 208/113 |
| 5,716,514 | A | 2/1998 | Buchanan | 208/113 |
| 5,741,468 | A | 4/1998 | Saito | 423/239.1 |
| 5,744,686 | A | 4/1998 | Gajda | 585/823 |
| 5,785,947 | A | 7/1998 | Zones et al. | 423/705 |
| 5,807,528 | A | 9/1998 | Nakano et al. | 423/213.2 |
| 5,827,793 | A | 10/1998 | Hu | 502/41 |
| 5,830,346 | A | 11/1998 | Harandi et al. | 208/113 |
| 5,879,645 | A | 3/1999 | Park | 423/213.2 |
| 5,908,804 | A | 6/1999 | Menon et al. | 502/38 |
| 5,908,806 | A | 6/1999 | Kharas | 502/64 |
| 5,958,818 | A | 9/1999 | Demmel et al. | 502/68 |
| 5,985,225 | A | 11/1999 | Ohtsuka | 423/239.2 |
| 5,993,642 | A | 11/1999 | Mohr et al. | 208/46 |
| 6,017,508 | A | 1/2000 | Millar et al. | 423/700 |
| 6,033,641 | A | 3/2000 | Hall et al. | 423/239.2 |
| 6,040,259 | A | 3/2000 | Mohr | 502/67 |
| 6,090,271 | A | 7/2000 | Carpency | 208/113 |
| 6,103,208 | A | 8/2000 | Ogawa et al. | 423/213.2 |
| 6,103,949 | A | 8/2000 | Demmel et al. | 585/722 |
| 6,106,697 | A | 8/2000 | Swan et al. | 208/77 |
| 6,110,258 | A | 8/2000 | Fraenkel et al. | 95/117 |
| 6,114,265 | A | 9/2000 | Steffens et al. | 502/52 |
| 6,129,834 | A | 10/2000 | Peters et al. | 208/120.01 |
| 6,143,167 | A | 11/2000 | Peters et al. | 208/113 |
| 6,143,681 | A | 11/2000 | Sachtler et al. | 502/74 |
| 6,165,933 | A | 12/2000 | Peters et al. | 502/330 |
| 6,190,538 | B1 | 2/2001 | Gosselink et al. | 208/111.01 |
| 6,214,211 | B1 | 4/2001 | Itoh | 208/118 |
| 6,280,607 | B1 | 8/2001 | Peters et al. | 208/120.01 |
| 6,284,703 | B1 | 9/2001 | Ostgard et al. | 502/301 |
| 6,309,758 | B1 | 10/2001 | Schmidt | 428/570 |
| 6,358,881 | B1 | 3/2002 | Peters et al. | 502/304 |
| 6,376,708 | B1 | 4/2002 | Morgenstern et al. | 562/536 |
| 6,379,536 | B1 | 4/2002 | Peters et al. | 208/120.01 |
| 6,380,119 | B1 | 4/2002 | Grosch et al. | 502/49 |
| 8,395,403 | | 5/2002 | Schmidt | 428/570 |
| 6,413,898 | B1 | 7/2002 | Faber et al. | 502/64 |
| 6,471,924 | B1 | 10/2002 | Feeley et al. | 423/213.5 |
| 6,479,421 | B1 | 11/2002 | Vierheilig | 502/84 |
| 6,528,031 | B1 | 3/2003 | Park et al. | 423/239.2 |
| 6,538,169 | B1 * | 3/2003 | Pittman et al. | 585/653 |
| 6,558,533 | B2 | 5/2003 | Schmidt et al. | 208/244 |
| 6,660,683 | B1 * | 12/2003 | Yaluris et al. | 502/241 |
| 7,304,011 | B2 * | 12/2007 | Yaluris et al. | 502/65 |
| 2001/0002426 | A1 | 5/2001 | Mohr et al. | 585/407 |
| 2002/0013228 | A1 | 1/2002 | Matsumoto et al. | 502/325 |
| 2002/0016259 | A1 | 2/2002 | Tsao | 502/324 |
| 2002/0022573 | A1 | 2/2002 | Tanada et al. | 502/344 |
| 2002/0022574 | A1 | 2/2002 | Tanada et al. | 502/527.12 |
| 2002/0037808 | A1 | 3/2002 | Ostgard et al. | 502/301 |
| 2002/0038051 | A1 | 3/2002 | Ostgard et al. | 562/538 |
| 2002/0049132 | A1 | 4/2002 | Jan et al. | 502/60 |
| 2002/0082159 | A1 | 6/2002 | Grosch et al. | 502/38 |
| 2002/0082460 | A1 | 6/2002 | Verduijn et al. | 585/475 |
| 2002/0094314 | A1 | 7/2002 | Miyadera et al. | 423/239.1 |
| 2002/0094932 | A1 | 7/2002 | Faber et al. | 502/74 |
| 2002/0120169 | A1 | 8/2002 | Spagnol et al. | 568/316 |
| 2002/0139112 | A1 | 10/2002 | Onodera et al. | 60/286 |
| 2002/0160905 | A1 | 10/2002 | Loyalka et al. | 502/60 |
| 2002/0183191 | A1 | 12/2002 | Faber et al. | 502/63 |
| 2002/0187098 | A1 | 12/2002 | Pinnavaia et al. | 423/702 |
| 2002/0189973 | A1 | 12/2002 | Henry et al. | 208/74 |
| 2002/0192155 | A1 | 12/2002 | Sterte et al. | 423/700 |
| 2003/0019794 | A1 | 1/2003 | Schmidt et al. | 208/244 |
| 2003/0040425 | A1 | 2/2003 | Huang et al. | 502/64 |
| 2003/0073566 | A1 | 4/2003 | Marshall et al. | 502/64 |
| 2003/0166453 | A1 * | 9/2003 | Kuvettu et al. | 502/68 |

FOREIGN PATENT DOCUMENTS

| | | |
|---|---|---|
| WO | WO 03/046112 | 6/2003 |
| WO | 2005/047429 | 5/2005 |

* cited by examiner

COMPOSITIONS AND PROCESSES FOR REDUCING $NO_x$ EMISSIONS DURING FLUID CATALYTIC CRACKING

CROSS REFERENCE TO RELATED APPLICATIONS

This application is a continuation of U.S. patent application Ser. No. 10/909,709, filed Aug. 2, 2004 now abandoned, which is a continuation in part application of U.S. patent application Ser. No. 10/824,913, filed Apr. 15, 2004, now U.S. Pat. No. 7,304,011.

FIELD OF THE INVENTION

The present invention relates to $NO_x$ reduction compositions and the method of use thereof to reduce $NO_x$ emissions in refinery processes, and specifically in fluid catalytic cracking (FCC) processes. More particularly, the present invention relates to $NO_x$ reduction compositions and the method of use thereof to reduce the content of $NO_x$ off gases released from a fluid catalytic cracking unit (FCCU) regenerator during the FCC process without a substantial change in hydrocarbon conversion or the yield of valuable cracked products.

BACKGROUND OF THE INVENTION

In recent years there has been an increased concern in the United States and elsewhere about air pollution from industrial emissions of noxious oxides of nitrogen, sulfur and carbon. In response to such concerns, government agencies have placed limits on allowable emissions of one or more of these pollutants, and the trend is clearly in the direction of increasingly stringent regulations.

$NO_x$, or oxides of nitrogen, in flue gas streams exiting from fluid catalytic cracking (FCC) regenerators is a pervasive problem. Fluid catalytic cracking units (FCCUs) process heavy hydrocarbon feeds containing nitrogen compounds, a portion of which is contained in the coke on the catalyst as it enters the regenerator. Some of this coke-nitrogen is eventually converted into $NO_x$ emissions, either in the FCC regenerator or in a downstream CO boiler. Thus, all FCCUs processing nitrogen-containing feeds can have a $NO_x$ emissions problem due to catalyst regeneration.

In the FCC process, catalyst particles (inventory) are continuously circulated between a catalytic cracking zone and a catalyst regeneration zone. During regeneration, coke deposited on the cracking catalyst particles in the cracking zone is removed at elevated temperatures by oxidation with oxygen containing gases such as air. The removal of coke deposits restores the activity of the catalyst particles to the point where they can be reused in the cracking reaction. In general, when coke is burned with a deficiency of oxygen, the regenerator flue gas has a high $CO/CO_2$ ratio and a low level of $NO_x$, but when burned with excess oxygen, the flue gas has a high level of $NO_x$ and a reduced CO content. Thus, CO and $NO_x$ or mixtures of these pollutants are emitted with the flue gas in varying quantities, depending on such factors as unit feed rate, nitrogen content of the feed, regenerator design, mode of operation of the regenerator, and composition of the catalyst inventory.

Various attempts have been made to limit the amount of $NO_x$ gases emitted from the FCCU by treating the $NO_x$ gases after their formation, e.g., post-treatment of $NO_x$ containing gas streams as described in U.S. Pat. Nos. 4,434,147, 4,778, 664, 4,735,927, 4,798,813, 4,855,115, 5,413,699, and 5,547, 648.

Another approach has been to modify the operation of the regenerator to partial burn and then treat the $NO_x$ precursors in the flue gas before they are converted to $NO_N$, e.g., U.S. Pat. Nos. 5,173,278, 5,240,690, 5,372,706, 5,413,699, 5,705,053, 5,716,514, and 5,830,346.

Yet another approach has been to modify the operation of the regenerator as to reduce $NO_x$ emissions, e.g., U.S. Pat. No. 5,382,352, or modify the CO combustion promoter used, e.g., U.S. Pat. Nos. 4,199,435, 4,812,430, and 4,812,431. Enrichment of air with oxygen in a regenerator operating in partial burn mode has also been suggested, e.g., U.S. Pat. No. 5,908, 804.

Additives have also been used in attempts to deal with $NO_x$ emissions. U.S. Pat. Nos. 6,379,536, 6,280,607, 6,129,834 and 6,143,167 disclose the use of NOx removal compositions for reducing $NO_x$ emissions from the FCCU regenerator. U.S. Pat. Nos. 6,165,933 and 6,358,881 also disclose a $NO_x$ reduction composition, which promotes CO combustion during the FCC catalyst regeneration process step while simultaneously reducing the level of $NO_x$ emitted during the regeneration step. $NO_x$ reduction compositions disclosed by these patents may be used as an additive which is circulated along with the FCC catalyst inventory or incorporated as an integral part of the FCC catalyst.

U.S. Pat. Nos. 4,973,399 and 4,980,052 disclose reducing emissions of $NO_x$ from the regenerator of the FCCU by incorporating into the circulating inventory of cracking catalyst separate additive particles containing a copper-loaded zeolite.

Many additive compositions heretofore used to control $NO_x$ emissions have typically caused a significant decrease in hydrocarbon conversion or the yield of valuable cracked products, e.g., gasoline, light olefins and liquefied petroleum gases (LPGs), while increasing the production of coke. It is a highly desirable characteristic for $NO_x$ additives added to the FCCU not to affect the cracked product yields or change the overall unit conversion. The operation of the FCCU is typically optimized based on the unit design, feed and catalyst to produce a slate of cracked products and maximize refinery profitability. This product slate is based on the value model of the specific refinery. For example, during the peak summer driving season many refiners want to maximize gasoline production, while during the winter season refiners may want to maximize heating oil production. In other cases a refinery may find it profitable to produce light olefins products that can be sold in the open market or used in an associated petrochemical plant as feedstocks.

When a $NO_x$ reduction additive increases coke production, the FCCU may have insufficient air capacity to burn the extra coke and may result in a lower feed throughput in the unit. If the additive increases the production of low value dry gas, the production of more valuable products may decrease. An increase in dry gas may exceed the ability of the unit to handle it, thus forcing a reduction of the amount of feed processed. While an additive that increases light olefins production may be desirable if the refinery values these products and the unit has the equipment necessary to process the extra light hydrocarbons, the additive may reduce profitability if the refinery's goal is to maximize gasoline production. Light olefins are typically made in the FCCU at the expense of gasoline production. Even an additive which increases unit conversion may be undesirable if it affects product yields, causes the unit to reach an equipment limitation, and/or decreases the amount of feed that can be processed.

Consequently, any change to the FCCU that affects the product slate or changes the ability to process feed at the desired rate can be detrimental to the refinery profitability.

Therefore, there exists a need for NQ control compositions which do not significantly affect product yields and overall unit conversion.

SUMMARY OF THE INVENTION

It has now been discovered that the incorporation of a $NO_x$ reduction zeolite component with a catalytically cracking catalyst inventory, in particular a cracking catalyst inventory containing an active Y-type zeolite, being circulated throughout a fluid catalytic cracking unit (FCCU) during a fluid catalytic cracking (FCC) process provides superior NO, control performance without substantially changing or affecting the hydrocarbon conversion or the yield of cracked petroleum products produced during the FCC process.

In accordance with the present invention, novel $NO_x$ reduction compositions are provided. Typically, the compositions comprise a particulate composition containing particles of a $NO_x$ reduction zeolite component. In a preferred embodiment of the invention, the $NO_x$ reduction zeolite particles are bound with an inorganic binder. The binder preferably comprises silica, alumina or silica alumina. Preferably, the $NO_x$ reduction zeolite is exchanged with hydrogen, ammonium, alkali metal and combinations thereof. The preferred alkali metal is sodium, potassium and combinations thereof.

In one aspect of the invention, novel zeolite containing $NO_x$ reduction compositions are provided which are added to a circulating inventory of the catalytic cracking catalyst as a separate admixture of particles to reduce $NO_x$ emissions released from the FCCU regenerator during the FCC process.

In another aspect of the invention, novel $NO_x$ reduction compositions are provided which comprise a $NO_x$ reduction zeolite incorporated as an integral component of an FCC catalyst, preferably, containing a Y-type zeolite active cracking component.

In yet another aspect of the invention, novel $NO_x$ reduction compositions are provided which compositions reduce $NO_x$ emissions from the FCCU regenerator during the FCC process while substantially maintaining hydrocarbon conversion and the yield of cracked petroleum products and minimizing an increase in the production of coke.

It is another aspect of the present invention to provide a process for the reduction of the content of $NO_x$ in the off gas of the FCCU regenerator during the FCC process using $NO_x$ reduction compositions in accordance with the present invention.

Another aspect of the invention is to provide improved FCC processes for the reduction of the content of $NO_x$ in the off gases of the FCCU regenerator without substantially affecting hydrocarbon conversion or the yield of petroleum products produced during the FCC process.

These and other aspects of the present invention are described in further detail below.

DETAILED DESCRIPTION OF THE INVENTION

Figure 1:
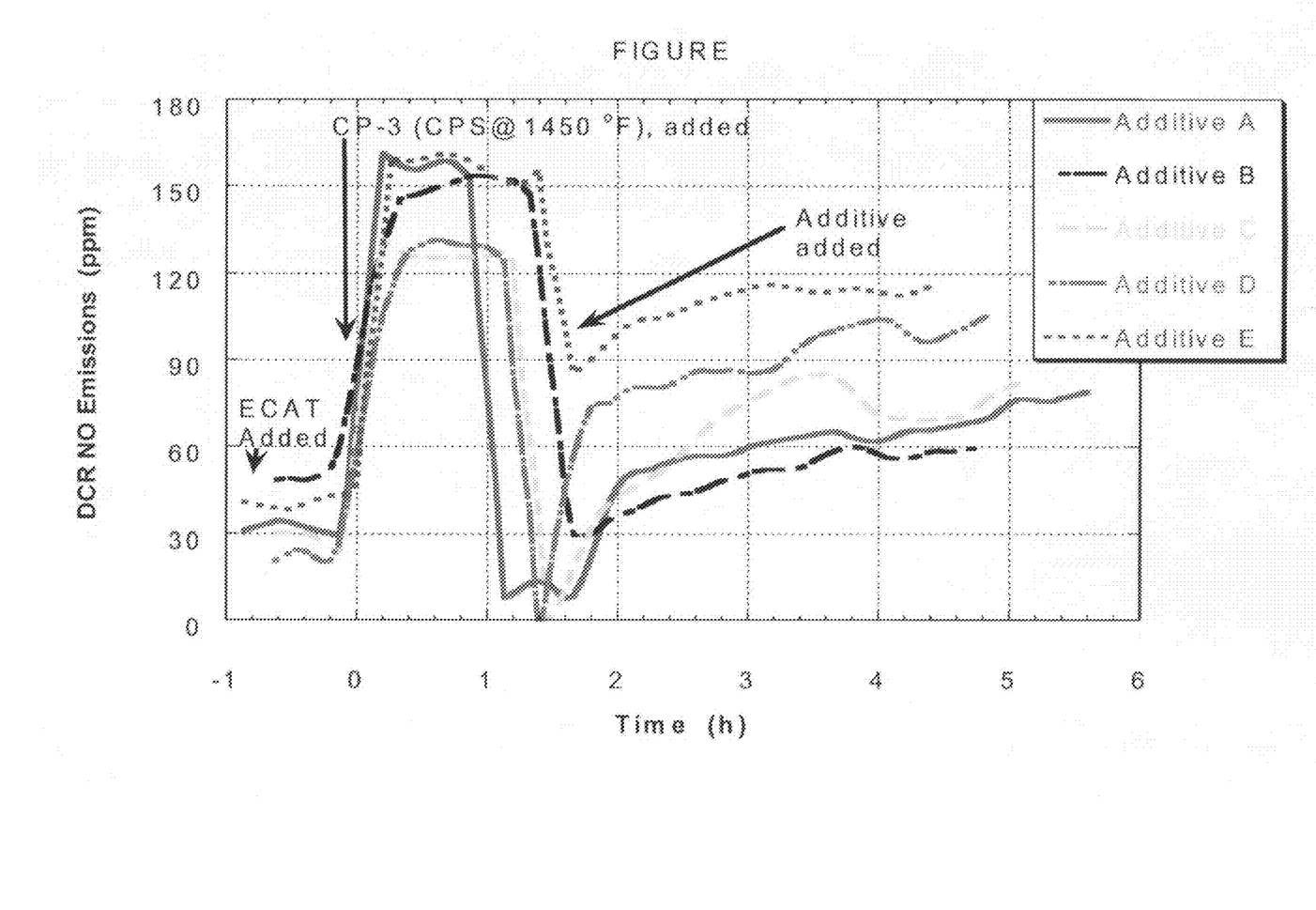
The FIGURE is a graphic representation of the effectiveness of Additive A, Additive B, Additive C, Additive D and Additive E prepared in EXAMPLES 1, 2, 3, 4 and 5 respectively, to reduce $NO_x$ emissions from a DCR regenerator versus time on stream, when the additives are blended with an equilibrium cracking catalyst (having the properties as shown in Table 2) which contains 0.25 weight percent of a platinum promoter, CP-3® (obtained from Grace Davison, Columbia, Md. and deactivated using the Cyclic Propylene Steaming procedure as described in EXAMPLE 6).

Although several nitrogen oxides are known which are relatively stable at ambient conditions, for purposes of the present invention, $NO_x$ will be used herein to represent nitric oxide, nitrogen dioxide (the principal noxious oxides of nitrogen) as well as $N_2O_4$, $N_2O_5$ and mixtures thereof.

The present invention encompasses the discovery that the use of certain zeolite containing $NO_x$ reduction compositions in combination with a fluid catalytic cracking (FCC) catalyst, preferably a catalyst comprising an active Y-type zeolite, is very effective for the reduction of $NO_x$ emissions released from the FCCU regenerator under FCC process conditions without a substantial change in hydrocarbon feed conversion or the yield of cracked products. Compositions of the invention typically comprise a particulate composition containing particles of a $NO_x$ reduction zeolite component. In a preferred embodiment of the invention, the $NO_x$ reduction zeolite particles are bound with an inorganic binder. The novel $NO_x$ reduction compositions may be added to the circulating inventory of the catalytic cracking catalyst as a separate particle additive or incorporated as an integral component into the cracking catalyst.

For purposes of the present invention, the phrase "a substantial change in hydrocarbon feed conversion or the yield of cracked products" is defined herein to mean in the alternative (i) less than a 30% relative change, preferably less than a 20% relative change and most preferably less than a 10% relative change in the yield of LCO (light cycle oils), bottoms and gasoline in combination with LPG as compared to the baseline yield of the same or substantially the same products; or (ii) less than a 10% relative change, preferably less than a 6.5% relative change and most preferably less than a 5% relative change in the hydrocarbon feed conversion as compared to the baseline conversion. The conversion is defined as 100% times (1–bottoms yield–LCO yield). When the $NO_x$ reduction composition is used as a separate additive, the baseline is the mean conversion or yield of a product in the FCCU, operating with the same or substantially the same feed and under the same or substantially the same reaction and unit conditions, but before the additive of the present invention is added to the catalyst inventory. When the $NO_x$ reduction composition is integrated or incorporated into the cracking catalyst particles to provide an integral $NO_x$ reduction catalyst system, a significant change in the hydrocarbon conversion or yield of cracked products is determined using a baseline defined as the mean conversion or yield of a product in the same or substantially the same FCCU operating with the same or substantially the same feed, under the same or substantially the same reaction and unit conditions, and with a cracking catalyst inventory comprising the same or substantially the same cracking catalyst composition as that containing the $NO_x$ reduction composition, except that the $NO_x$ reduction composition is replaced in the cracking catalyst with a matrix component such as kaolin or other filler. The percent changes specified above are derived from statistical analysis of DCR operating data.

Zeolites useful as the $NO_x$ reduction zeolite component in the present invention include zeolites having a pore size ranging from about 3 to about 7.2 Angstroms with $SiO_2$ to $Al_2O_3$ molar ratio of less than about 500, preferably less than 250, most preferably less than 100. Preferably, the $NO_x$ reduction zeolite component is a zeolite selected from the group consisting of ZSM-11, beta, MCM-49, mordenite, MCM-56, Zeolite-L, zeolite Rho, erriionite, chabazite, clinoptilolite, MCM-22, MCM-35, MCM-61, Offretite, A, ZSM-12, ZSM-23, ZSM-18, ZSM-22, ZSM-57, ZSM-61, ZK-5, NO, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite, omega or mixtures thereof. In the most preferred embodiment of the invention, the $NO_x$ reduction zeolite component is a zeolite selected from the group consisting of beta, MCM-49, mordenite, MCM-56, Zeolite-L, zeolite Rho, errionite, chabazite, clinoptilolite, MCM-22, Offretite, A, ZSM-12, ZSM-23, omega and mixtures thereof.

In a preferred embodiment of the invention, the $NO_x$ reduction zeolite has a surface area of at least 100 m²/g, preferably at least 200 m²/g and most preferably at least 300 m²/g. In another embodiment of the invention, the $NO_x$ reduction zeolite is exchanged with a material selected from the group consisting of hydrogen, ammonium, alkali metal and combinations thereof, prior to incorporation into the binder or FCC catalyst. The preferred alkali metal is one selected from the group consisting of sodium, potassium and mixtures thereof.

Optionally, the $NO_x$ reduction zeolite may contain stabilizing amounts, e.g., up to about 25 weight percent, of a stabilizing metal (or metal ion), preferably incorporated into the pores of the zeolite. Suitable stabilizing metals include, but are not limited to, metals selected from the group consisting of Groups 2A, 3B, 4B, 5B, 6B, 7B, 8B, 2B, 3A, 4A, 5A, and the Lanthanide Series of The Periodic Table, Ag and mixtures thereof. Preferably, the stabilizing metals are selected from the group consisting of Groups 3B, 2A, 2B, 3A and the Lanthanide Series of the Periodic Table, and mixtures thereof. Most preferably, the stabilizing metals are selected from the group consisting of lanthanum, aluminum, magnesium, zinc, and mixtures thereof. The metal may be incorporated into the pores of the $NO_x$ reduction zeolite by any method known in the art, e.g., ion exchange, impregnation or the like. For purposes of this invention, the Periodic Table referenced herein above is the Periodic Table as published by the American Chemical Society.

The amount of NOx reduction zeolite used in the catalyst/additive compositions of the invention will vary depending upon several factors, including but not limited to, the mode of combining the $NO_x$ reduction zeolite with the catalytic cracking catalyst and the type of cracking catalyst used. In one embodiment of the invention, the compositions of the invention are separate catalyst/additive compositions and comprise a particulate composition formed by binding particles of a $NO_x$ reduction zeolite component with a suitable inorganic binder. Generally, the amount of the $NO_x$ reduction zeolite component present in the particulate compositions of the invention is at least 10, preferably at least 30, most preferably at least 40 and even more preferably at least 50, weight percent based on the total weight of the composition. Typically, the particulate catalyst/additive composition of the invention contains from about 10 to about 85, preferably from about 30 to about 80, most preferably, from about 40 to about 75, weight percent of the $NO_x$ reduction zeolite component based on the total weight of the catalyst/additive composition.

Binder materials useful to prepare the particulate compositions of the invention include any inorganic binder which is capable of binding a zeolite powder to form particles having properties suitable for use in the FCCU under FCC process conditions. Typical inorganic binder materials useful to prepare compositions in accordance with the present invention include, but are not limited to, alumina, silica, silica alumina, aluminum phosphate and the like, and mixtures thereof. Preferably, the binder is selected from the group consisting of alumina, silica, silica alumina. More preferably, the binder comprises alumina. Even more preferably, the binder comprises an acid or base peptized alumina. Most preferably, the binder comprises an alumina sol, e.g., aluminum chlorohydrol. Generally, the amount of binder material present in the particular catalyst/additive compositions comprises from about 5 to about 50 weight percent, preferably from about 10 to about 30 weight percent, most preferably from about 15 to about 25 weight percent, of the catalyst/additive composition of the invention.

Additional materials optionally present in the compositions of the present invention include, but are not limited to, fillers (e.g., kaolin clay) or matrix materials (e.g., alumina, silica, silica alumina, yttria, lanthana, ceria, neodymia, samaria, europia, gadolinia, titania, zirconia, praseodymia and mixtures thereof). When used, the additional materials are used in an amount which does not significantly adversely affect the performance of the compositions to reduce $NO_x$ emissions released from the FCCU regenerator under FCC conditions, the hydrocarbon feed conversion or the product yield of the cracking catalyst. In general the additional materials will comprise no more than about 70 weight percent of the compositions. It is preferred, however, that the compositions of the invention consist essentially of the $NO_x$ reduction zeolite and an inorganic binder.

Particulate catalyst/additive compositions of the invention should have a particle size sufficient to permit the composition to be circulated throughout the FCCU simultaneously with the inventory of cracking catalyst during the FCC process. Typically the composition of the invention will have a mean particle size of greater than 45 μm. Preferably, the mean particle size is from about 50 to about 200 μm, most preferably from about 55 to about 150 μm, even more preferred from about 60 to about 120 μm. The compositions of the invention typically have a Davison attrition index (DI) value of less than about 50, preferably less than about 20, most preferably less than about 15.

While the present invention is not limited to any particular process of preparation, typically the particulate $NO_x$ reduction compositions of the invention are prepared by forming an aqueous slurry containing the $NO_x$ reduction zeolite, optional zeolite components, the inorganic binder, and optional matrix materials, in an amount sufficient to provide at least 10.0 weight percent of $NO_x$ reduction zeolite and at least 5.0 weight percent of binder material in the final catalyst/additive composition and, thereafter, spray drying the aqueous slurry to form particles. The spray-dried particles are optionally dried at a sufficient temperature for a sufficient time to remove volatiles, e.g., at about 90° C. to about 320° C. for about 0.5 to about 24 hours. In a preferred embodiment of the invention, the $NO_x$ reduction zeolite containing aqueous slurry is milled prior to spray-drying to reduce the mean particle size of materials contained in the slurry to 10 μm or less, preferably 5 μm or less, most preferably 3 μm or less. The aqueous slurry may be milled prior to or after incorporation of the binder and/or matrix materials as desired.

The spray-dried composition may be calcined at a temperature and for a time sufficient to remove volatiles and provide sufficient hardness to the binder for use in the FCCU under FCC process conditions, preferably from about 320° C. to about 900° C. from about 0.5 to about 6 hours.

Optionally, the dried or calcined composition is washed or exchanged with an aqueous solution of ammonia or ammonium salt (e.g., ammonium sulfate, nitrate, chloride, carbonate, phosphate and the like), or an inorganic or organic acid (e.g., sulfuric, nitric, phosphoric, hydrochloric, acetic, formic and the like) to reduce the amount of alkaline metals, e.g. sodium or potassium, in the finished product.

Particulate compositions of the invention are circulated in the form of separate particle additives along with the main cracking catalyst throughout the FCCU. Generally, the catalyst/additive composition is used in an amount of at least 0.1 weight percent of the FCC catalyst inventory. Preferably the amount of the catalyst/additive composition used ranges from about 0.1 to about 75 weight percent, most preferably from about 1 to about 50 weight percent of the FCC catalyst inventory. Separate particle catalyst/additive compositions of the invention may be added to the FCCU in the conventional manner, e.g., with make-up catalyst to the regenerator or by any other convenient method.

In a second embodiment of the invention, the $NO_x$ reduction zeolite is integrated or incorporated into the cracking catalyst particles themselves to provide an integral $NO_x$ reduction catalyst system. In accordance with this embodiment of the invention, the $NO_x$ reduction zeolite may be added to the catalyst at any stage during catalyst manufacturing prior to spray drying the cracking catalyst slurry to obtain the fluid cracking catalyst, regardless of any additional optional or required processing steps needed to finish the cracking catalyst preparation. Without intending to limit the incorporation of the $NO_x$ reduction zeolite component, and any optional zeolites, within the cracking catalyst to any specific method of cracking catalyst manufacturing, typically the $NO_x$ reduction zeolite component, any additional zeolites, the cracking catalyst zeolite, usually USY or REUSY-type, and any matrix materials are slurried in water. The slurry is milled to reduce the mean particle size of solids in the slurry to less than 10 μm, preferably to less than 5 μm, most preferably less than 3 μm. The milled slurry is combined with a suitable binder, i.e., a silica sol binder, and optional matrix material, e.g. clay. The slurry is then mixed and spray-dried to form a catalyst. The spray-dried catalyst is optionally washed using an aqueous solution of ammonium hydroxide, an ammonium salt, an inorganic or organic acid, and water to remove the undesirable salts. The washed catalyst may be exchanged with a water soluble rare-earth salt, e.g., rare-earth chlorides, nitrates and the like.

Alternatively, the $NO_x$ reduction zeolite component, optional additional zeolites, the cracking catalyst zeolite, any matrix materials, a rare-earth water soluble salt, clay and alumina sol binder are slurried in water and blended. The slurry is milled and spray-dried. The spray-dried catalyst is calcined at about 250° C. to about 900° C. The spray-dried catalyst may then optionally be washed using an aqueous solution of ammonium hydroxide, an ammonium salt, an inorganic or organic acid, and water to remove the undesirable salts. Optionally, the catalyst may be exchanged with a water-soluble rare-earth salt after it has been washed, by any of the methods known in the art.

When integrated into the FCC catalyst particles, the $NO_x$ reduction zeolite component typically represents at least 0.1 weight percent of the FCC catalyst particle. Preferably, the amount of the $NO_x$ reduction zeolite component used ranges from about 0.1 to about 60 weight percent, most preferably from about 1 to about 40 weight percent, of the FCC catalyst particles.

The integrated FCC catalyst will typically comprise the $NO_x$ reduction zeolite component along with the cracking catalyst zeolite, inorganic binder materials and optionally, matrix, fillers, and other additive components such as metals traps (for example, traps for Ni and V) to make up the cracking catalyst. The cracking catalyst zeolite, usually a Y, USY or REUSY-type, provides the majority of the cracking activity and is typically present in a range from about 10 to about 75, preferably from about 15 to about 60 and most preferably from about 20 to about 50 weight percent based on the total weight of the composition. Inorganic binder materials useful to prepare integrated catalyst compositions in accordance with the present invention include any inorganic material capable of binding the components of the integrated catalyst to form particles having properties suitable for use in the FCCU under FCC process conditions. Typically, the inorganic binder materials include, but are not limited to, alumina, silica, silica alumina, aluminum phosphate and the like, and mixtures thereof. Preferably, the binder is selected from the group consisting of alumina, silica, silica alumina. Generally, the amount of binder material present in the integrated catalyst composition is less than 50 weight percent based on the total weight of the catalyst composition. Preferably, the inorganic binder materials is present in the integrated catalyst in an amount ranging from about 5 to about 45 weight percent, more preferably from about 10 to about 30 weight percent and most preferably from about 15 to about 25 weight percent, based on the total weight of the composition.

The matrix materials optionally present in the integrated catalyst compositions of the present invention include, but are not limited to alumina, silica alumina, rare earth oxides such as lanthana, transition metal oxides such as titania, zirconia, and manganese oxide, group 2A oxides such as magnesium and barium oxides, clays such as kaolin, and mixtures thereof. The matrix and/or fillers are typically present in the integral catalyst in an amount of less than 50 weight percent based on the total weight of the catalyst composition. Preferably, the matrix and/or fillers are present in an amount ranging from about 1 to about 45 weight percent based on the total weight of the catalyst composition.

The particle size and attrition properties of the integral catalyst affect fluidization properties in the unit and determine how well the catalyst is retained in the commercial FCC unit. The integral catalyst composition of the invention typically has a mean particle size of about 45 to about 200 μm, more preferably from about 50 μm to about 150 μm. The attrition properties of the integral catalyst, as measured by the Davison Attrition Index (DI), have a DI value of less than 50, more preferably less than 20 and most preferably less than 15.

In a preferred embodiment of the invention, the FCC cracking catalyst contains a Y-type zeolite. The $NO_x$ reduction zeolite may be added as a separate additive particle to a circulating inventory of the cracking catalyst or incorporated directly into the Y-type zeolite containing cracking catalyst as an integral component of the catalyst. In either case, it is preferred that the $NO_x$ reduction zeolite be present in that amount sufficient to provide in the total catalyst inventory a ratio of $NO_x$ reduction zeolite to Y-type zeolite of less than 2, preferably less than 1.

It is also within the scope of the invention to include additional zeolite components in the catalyst/additive compositions of the invention. The additional zeolite component may be any zeolite which does not adversely affect the $NO_x$ reduction performance or cause a substantial change in hydrocarbon conversion or cracked product yields during the FCC process. Preferably, the additional zeolite component is a zeolite selected from the group consisting of ferrierite, ZSM-5, ZSM35 and mixtures thereof. The additional zeolite component is used in any amount that does not significantly adversely affect the performance of the $NO_x$ reduction zeolite compositions to reduce $NO_x$ emissions and substantially maintain the hydrocarbon conversion and product yields of the cracking catalyst relative to the use of the cracking catalyst without the $NO_x$ reduction catalyst/additive composition. Typically, the additional zeolite component is used in an amount ranging from about 1 to about 80, preferably from about 10 to about 70, weight percent of the catalyst/additive composition. Where the $NO_x$ reduction zeolite is used as an integral component of the catalyst, the additional zeolite component is preferably used in an amount ranging from about 0.1 to about 60, most preferably from about 1 to about 40, weight percent of the catalyst composition.

Somewhat briefly, the FCC process involves the cracking of heavy hydrocarbon feedstocks to lighter products by contact of the feedstock in a cyclic catalyst recirculation cracking process with a circulating fluidizable cracking catalyst inventory consisting of particles having a mean size ranging from about 50 to about 150 µm, preferably from about 60 to about 120 µm. The catalytic cracking of these relatively high molecular weight hydrocarbon feedstocks results in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated in a catalyst regeneration zone to produce hot, regenerated catalyst which is then recycled to the cracking zone for cracking further quantities of feed.

Conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1, as well as in numerous other sources such as Sadeghbeigi, *Fluid Catalytic Cracking Handbook*, Gulf Publ. Co. Houston, 1995, ISBN 0-88415-290-1. Preferably, the FCC catalyst is a catalyst comprising a Y-type zeolite active cracking component. In a particularly preferred embodiment of the invention, the FCC catalysts consist of a binder, usually silica, alumina, or silica alumina, a Y-type zeolite active component, one or more matrix aluminas and/or silica aluminas, and fillers such as kaolin clay. The Y-type zeolite may be present in one or more forms and may have been ultra stabilized and/or treated with stabilizing cations such as any of the rare-earths.

Typical FCC processes are conducted at reaction temperatures of 480° C. to 600° C. with catalyst regeneration temperatures of 600° C. to 800° C. As it is well known in the art, the catalyst regeneration zone may consist of a single or multiple reactor vessels. The compositions of the invention may be used in FCC processing of any typical hydrocarbon feedstock. Suitable feedstocks include petroleum distillates or residuals of crude oils having a boiling point range of about 150° C. to about 900° C., preferably, about 200° C. to about 800° C., which when catalytically cracked provide a gasoline or other petroleum product. Synthetic feeds having boiling points of about 200° C. to about 800° C., such as oil from coal, tar sands or shale oil, can also be included.

In order to remove coke from the catalyst, oxygen or air is added to the regeneration zone. This is performed by a suitable sparging device in the bottom of the regeneration zone, or if desired, additional oxygen is added to the dilute or dense phase of the regeneration zone.

Catalyst/additive compositions in accordance with the invention dramatically reduce, i.e., by at least 10%, preferably at least 20%, the emissions of $NO_x$ in the FCCU regenerator effluent during the catalyst regeneration, while substantially maintaining the hydrocarbon feed conversion or the yield of cracked products, e.g., gasoline and light olefins, obtained from the cracking catalyst. In some cases, $NO_x$ reduction of 90% or greater is readily achievable using the compositions and method of the invention without significantly affecting the cracked products yields or feed conversion. However, as will be understood by one skilled in the catalyst art, the extent of $NO_x$ reduction will depend on such factors as, for example, the composition and amount of the additive utilized; the design and the manner in which the catalytic cracking unit is operated, including but not limited to oxygen level and distribution of air in the regenerator, catalyst bed depth in the regenerator, stripper operation and regenerator temperature, the properties of the hydrocarbon feedstock cracked, and the presence of other catalytic additives that may affect the chemistry and operation of the regenerator. Thus, since each FCCU is different in some or all of these respects, the effectiveness of the process of the invention may be expected to vary from unit to unit. $NO_x$ reduction compositions of the invention also prevent a significant increase in the production of coke during the FCC process.

It is also within the scope of the invention that $NO_x$ reduction compositions of the invention may be used alone or in combination with one or more additional $NO_x$ reduction component to achieve $NO_x$ reduction more efficiently than the use of either of the compositions alone. Preferably, the additional $NO_x$ reduction component is a non-zeolitic material, that is, a material that contains no or substantially no (i.e., less than 5 weight percent, preferably less than 1 weight percent) zeolite.

One such class of non-zeolitic materials suitable for use in combination with the $NO_x$ reduction compositions of the invention include noble metal containing $NO_x$ reduction compositions such as disclosed and described in U.S. Pat. No. 6,660,683 B1, the entire disclosure of which is herein incorporated by reference. Compositions in this class will typically comprise a particulate mixture of (1) an acidic metal oxide containing substantially no zeolite (preferably containing silica and alumina, most preferably containing at least 1 weight percent alumina); (2) an alkali metal (at least 0.5 weight percent, preferably about 1 to about 15 weight percent), an alkaline earth metal (at least 0.5 weight percent, preferably about 0.5 to about 50 weight percent) and mixtures thereof; (3) at least 0.1 weight percent of an oxygen storage metal oxide component (preferably ceria); and (4) at least 0.1 ppm of a noble metal component (preferably Pt, Pd, Rh, Ir, Os, Ru, Re and mixtures thereof). Preferred compositions in this class of materials comprise (1) an acidic oxide containing at least 50 weight percent alumina and substantially no zeolite; (2) at least 0.5 weight percent of an alkali metal and/or an alkaline earth metal or mixtures thereof; (3) about 1 to about 25 weight percent of an oxygen storage capable transition metal oxide or a rare-earth (preferably, ceria); and (4) at least 0.1 ppm of a noble metal selected from the group consisting of Pt, Rh, Ir, and a combination thereof, all percentages being based on the total weight of the oxidative catalyst/additive composition.

Another class of non-zeolitic materials suitable for use in combination with the $NO_x$ reduction compositions of the invention include a low $NO_x$, CO combustion promoter as disclosed and described in U.S. Pat. Nos. 6,165,933 and 6,358,881, the entire disclosure of these patents being herein incorporated by reference. Typically, the low $NO_x$ CO combustion promoter compositions comprise (1) an acidic oxide support; (2) an alkali metal and/or alkaline earth metal or mixtures thereof; (3) a transition metal oxide having oxygen storage capability; and (4) palladium. The acidic oxide support preferably contains silica alumina. Ceria is the preferred oxygen storage oxide. Preferably, the $NO_x$ reduction composition comprises (1) an acidic metal oxide support containing at least 50 weight percent alumina; (2) about 1-10 parts by weight, measured as metal oxide, of at least one alkali metal, alkaline earth metal or mixtures thereof; (3) at least 1 part by weight of $CeO_2$; and (4) about 0.01-5.0 parts by weight of Pd, all of said parts by weight of components (2)-(4) being per 100 parts by weight of said acidic metal oxide support material.

Yet another class of non-zeolitic materials suitable for use in combination with the $NO_x$ reduction compositions of the invention include $NO_x$ reduction compositions as disclosed and described in U.S. Pat. Nos. 6,379,536, 6,280,607 B1, 6,143,167 and 6,129,834, the entire disclosure of these patents being herein incorporated by reference. In general, the $NO_x$ reduction compositions comprise (1) an acidic oxide support; (2) an alkali metal and/or alkaline earth metal or mixtures thereof; (3) a transition metal oxide having oxygen storage capability; and (4) a transition metal selected from Groups IB and IIB of the Periodic Table. Preferably, the acidic oxide support contains at least 50 weight percent alumina and preferably contains silica alumina. Ceria is the preferred oxygen storage oxide. In a preferred embodiment of the invention, the $NO_x$ reduction compositions comprise (1) an acidic oxide support containing at least 50 weight percent alumina; (2) 1-10 weight percent, measured as the metal oxide, of an alkali metal, an alkaline earth metal or mixtures thereof; (3) at least 1 weight percent $CeO_2$; and (4) 0.01-5.0 parts weight percent of a transition metal, measured as metal oxide, of Cu or Ag, all parts by weight of components (2)-(4) being per 100 parts by weight of said acidic oxide support.

Another class of non-zeolitic $NO_x$ reduction materials suitable for use in combination with the $NO_x$ reduction compositions of the invention include magnesium-aluminum spinel based additives heretofore being useful for the removal of sulfur oxides from a FCC regenerator. Exemplary patents which disclose and describe this type of materials include U.S. Pat. Nos. 4,963,520, 4,957,892, 4,790,982, 4,957,718, 4,471,070, 4,472,532, 4,476,245, 4,728,635, 4,830,840, 4,428,827, 4,904,627, 5,371,055, 4,495,304, 4,642,178, 4,469,589, 4,758,418, 4,522,937, 4,472,267 and 4,495,305 the entire disclosure of said patents being herein incorporated by reference. Preferably, compositions in this class comprise at least one metal-containing spinel which includes a first metal and a second metal having a valence higher than the valence of said first metal, at least one component of a third metal other than said first and second metals and at least one component of a fourth metal other than said first, second and third metals, wherein said third metal is selected from the group consisting of Group IB metals, Group IIB metals, Group VIA metals, the rare-earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof. Preferably, the metal containing spinel comprises magnesium as said first metal and aluminum as said second metal, and the atomic ratio of magnesium to aluminum in said spinet is at least about 0.17. The third metal in the spinel preferably comprises a metal selected from the group consisting of the Platinum Group metals, the rare-earth metals and mixtures thereof. The third metal component is preferably present in an amount in the range of about 0.001 to about 20 weight percent, calculated as elemental third metal, and said fourth metal component is present in an amount in the range of about 0.001 to about 10 weight percent, calculated as elemental fourth metal.

Other non-zeolitic materials useful in combination with the $NO_x$ reduction additives of the invention include, but are not limited to, zinc based catalysts such as disclosed and described in U.S. Pat. No. 5,002,654; antimony based $NO_x$ reduction additives such as described and disclosed in U.S. Pat. No. 4,988,432; perovskite-spinel $NO_x$ reduction additives such as described and disclosed in U.S. Pat. Nos. 5,364,517 and 5,565,181; hydrotalcite catalyst and additive compositions such as described and disclosed, for example, in U.S. Pat. Nos. 4,889,615, 4,946,581, 4,952,382, 5,114,691, 5,114,898, 6,479,421 B1 and PCT International Publication No. WO 95/03876; and low $NO_x$ promoter additive compositions such as described, for example in U.S. Pat. No. 4,290,878; the entire disclosure of each patent being herein incorporated by reference.

It is also within the scope of the invention to use the $NO_x$ reduction compositions of the invention in combination with $NO_x$ removal compositions as disclosed and described in PCT International Publication Number WO 03/046112 A1 and PCT International Publication No. WO 2004/033091 A1, the entire disclosures of which are herein incorporated by reference. Such $NO_x$ removal composition generally comprises (i) an acidic oxide support, (ii) cerium oxide, (iii) a lanthanide oxide other than ceria and (iv) optionally, at least one oxide of a transition metal selected from Groups IB and IIB of the Periodic Table, noble metals and mixtures thereof.

When used, the additional non-zeolitic $NO_x$ reduction compositions are used in an amount sufficient to provide increased $NO_x$ reduction when compared to the use of the catalyst/additive compositions alone. Typically, the additional non-zeolitic compositions are used in an amount up to about 50 weight percent of the FCC catalyst inventory. Preferably, the non-zeolitic composition is used in an amount up to about 30 weight percent, most preferably up to about 10 weight percent of the FCC catalyst inventory. The additional $NO_x$ reduction composition may be blended with the FCC catalyst inventory as a separate particle additive. Alternatively, the additional $NO_x$ reduction composition may be incorporated into the FCC catalyst as an integral component of the catalyst.

It is also contemplated within the scope of the present invention that catalyst/additive compositions in accordance with the present invention may be used in combination with other additives conventionally used in the FCC process, e.g., $SO_x$ reduction additives, gasoline-sulfur reduction additives, CO combustion promoters, additives for the production of light olefins, and the like.

The scope of the invention is not in any way intended to be limited by the examples set forth below. The examples include the preparation of catalyst/additives useful in the process of the invention and the evaluation of the invention process to reduce $NO_x$ in a catalytic cracking environment. The examples are given as specific illustrations of the claimed invention. It should be understood, however, that the invention is not limited to the specific details set forth in the examples.

All parts and percentages in the examples, as well as the remainder of the specification which refers to solid compositions or concentrations, are by weight unless otherwise specified. Concentrations of gaseous mixtures are by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

A composition containing 40% MCM-49 and 40% clay bound with 20% silica sol (Additive A) was prepared as follows. An aqueous slurry containing 25% MCM-49 ($SiO_2$/$Al_2O_3$=18) was milled in a Drais mill. The milled MCM-49 slurry (4880 g) was combined with 1200 g Natka clay (dry basis) and 6000 g silica sol binder (10% solids). The silica sol binder was prepared from sodium silicate and acid alum. The catalyst slurry was then spray dried in a Bowen spray drier. The resulting spray dried product was washed with ammonium sulfate solution, followed by water to give a catalyst with a $Na_2O$ level of less than 0.1 wt %. The properties of the catalyst are shown in Table 1.

Example 2

A composition containing 40% beta and 40% clay bound with 20% silica sol (Additive B) was prepared as follows. An aqueous slurry containing 21% beta ($SiO_2$/$Al_2O_3$=28) was milled in a Drais mill. The milled beta slurry (5670 g) was combined with 1200 g Natka clay (dry basis) and 6000 g silica sol binder (10% solids). The silica sol binder was prepared from sodium silicate and acid alum. The catalyst slurry was then spray dried in a Bowen spray drier. The resulting spray dried product was washed with ammonium sulfate solution, followed by water to give a catalyst with a $Na_2O$ level of less than 0.1 wt %. The properties of the catalyst are shown in Table 1.

Example 3

A composition containing 40% mordenite and 40% clay bound with 20% silica sol (Additive C) was prepared as follows. An aqueous slurry containing 21% Mordenite ($SiO_2$/$Al_2O_3$=19) was milled in a Drais mill. The milled mordenite slurry (3850 g) was combined with 800 g Natka clay (dry basis) and 4000 g silica sol binder (10% solids). The silica sol binder was prepared from sodium silicate and acid alum. The catalyst slurry was then spray dried in a Bowen spray drier. The resulting spray dried product was washed with ammonium sulfate solution, followed by water to give a catalyst with a Na2O level of less than 0.1 wt %. The properties of the catalyst are shown in Table 1.

Example 4

A composition containing 40% Zeolite L and 40% clay bound with 20% silica sol (Additive D) was prepared as follows. An aqueous slurry containing 25% Zeolite L ($SiO_2$/$Al_2O_3$=6) was milled in a Drais mill. The milled Zeolite L slurry (5050 g) was combined with 1200 g Natka clay (dry basis) and 6000 g silica sol binder (10% solids). The silica sol binder was prepared from sodium silicate and acid alum. The catalyst slurry was then spray dried in a Bowen spray drier. The resulting spray dried product was washed with ammonium sulfate solution, followed by water to give a catalyst with a $Na_2O$ level of less than 0.1 wt %. The properties of the catalyst are shown in Table 1.

Example 5

A composition containing 40% MCM-56 and 40% clay bound with 20% silica sol (Additive E) was prepared as follows. An aqueous slurry containing 21.8% MCM-56 ($SiO_2$/$Al_2O_3$=19) was milled in a Drais mill. The milled MCM-56 slurry (5765 g) was combined with 1200 g Natka clay (dry basis) and 6000 g silica sol binder (10% solids). The silica sol binder was prepared from sodium silicate and acid alum. The catalyst slurry was then spray dried in a Bowen spray drier. The resulting spray dried product was washed with ammonium sulfate solution, followed by water to give a catalyst with a $Na_2O$ level of less than 0.1 wt %. The properties of the catalyst are shown in Table 1.

TABLE 1

Properties of Additives A through E.

|  |  | Additive A | Additive B | Additive C | Additive D | Additive E |
|---|---|---|---|---|---|---|
| TV @ 1750° F. | Wt. % | 5.68 | 3.72 | 4.76 | 5.11 | 5.09 |
| $SiO_2$ | Wt. % | 75.9 | 75.1 | 76.3 | 70.5 | 75.4 |
| $Al_2O_3$ | Wt. % | 23.0 | 22.8 | 22.4 | 17.0 | 22.2 |
| $RE_2O_3$ | Wt. % | 0.02 | 0.02 | 0.19 | 0.01 | 0.01 |
| $Na_2O$ | Wt. % | <0.023 | <0.027 | <0.020 | <0.023 | <0.022 |
| Fe | Wt. % | 0.44 | 0.44 | 0.43 | 0.23 | 0.42 |
| $TiO_2$ | Wt. % | 0.96 | 0.95 | 1.10 | 0.52 | 0.02 |
| $K_2O$ | Wt. % |  |  |  | 1.681 |  |
| SA | m2/g | 244 | 238 | 269 | 258 | 218 |
| Zeolite | m2/g | 182 | 174 | 224 | 196 | 124 |
| Matrix | m2/g | 62 | 64 | 45 | 62 | 94 |

Example 6

The ability of Additives A-E to reduce $NO_x$ emissions from the FCC unit was evaluated using the Davison Circulating Riser (DCR). The description of the DCR has been published in the following papers: G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52; G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis Volume 76, p. 257, Elsevier Science Publishers B.V., Amsterdam 1993, ISBN 0-444-89037-8. The DCR was started up by charging the unit with approximately 1800 g of equilibrium catalyst having properties as shown in Table 2 below. The properties of the additives tested are summarized in Table 1 above. For the purposes of this test, a commercial FCC feed was used having the properties as shown in Table 3 below.

TABLE 2

Properties of equilibrium catalyst used in DCR tests.

| $SiO_2$ | wt. % | 50.9 |
|---|---|---|
| $Al_2O_3$ | wt. % | 45.5 |
| $RE_2O_3$ | wt. % | 0.37 |
| $Na_2O$ | wt. % | 0.37 |
| Fe | wt. % | 0.6 |
| $TiO_2$ | wt. % | 1.2 |
| MgO | wt. % | 0.319 |
| Ni | ppm | 681 |
| V | ppm | 1160 |
| SA | $m^2/g$ | 188 |
| Zeolite | $m^2/g$ | 128 |
| Matrix | $m^2/g$ | 60 |

TABLE 3

Properties of feed used in DCR tests

| API Gravity @ 600F. | 23.2 |
|---|---|
| Sulfur, wt. % | 0.023 |
| Total Nitrogen, wt. % | 0.13 |
| Basic Nitrogen, wt. % | 0.0378 |
| Conradson Carbon, wt. % | 0.03 |
| Fe, ppm | 0.7 |
| Na, ppm | 0.7 |
| K Factor | 11.4 |
| Simulated Distillation, vol. %, of | |
| 5 | 453 |
| 20 | 576 |
| 40 | 660 |
| 60 | 743 |
| 80 | 838 |
| FBP | 1153 |

The DCR was operated with 1% excess $O_2$ in the regenerator, and with the regenerator operating at 1300° F. (705° C.). After the unit stabilized the baseline NO emissions data were collected using an on-line Lear-Siegler $SO_2$/NO Analyzer (SM8100A). Subsequently, 100 g of catalyst were injected into the DCR consisting of 4.725 g of a commercial sample of a Pt-based combustion promoter (CP®-3) which had been deactivated for 20 h at 1450° F. (788° C.) without any added Ni or V using the Cyclic Propylene Steaming method (CPS) and equilibrium catalyst. The description of the CPS method has been published in L. T. Boock, T. F. Petti, and J. A Rudesill, "Contaminant-Metal Deactivation and Metal-Dehydrogenation Effects During Cyclic Propylene Steaming of Fluid Catalytic Cracking Catalysts," Deactivation and Testing of Hydrocarbon Processing Catalysts, ACS Symposium Series 634, p. 171 (1996), ISBN 0-8412-3411-6.

After the unit stabilized again, the NO emissions data was collected. Thereafter, 210 g of the additive to be tested along with 0.525 g of Pt based CO promoter was added to the DCR. The results are recorded in Table 4 below.

As shown in that table and the FIGURE, Additives A through E are effective in reducing NO emissions from the DCR regenerator. The additives are especially effective in decreasing NO emissions without significantly affecting the cracked products yields as shown below in Table 5.

TABLE 4

Reduction of NO emissions from the regenerator of the Davison Circulating Riser (DCR) when using Zeolite based additives. TOS is time on stream from the time of adding Pt CO combustion promoter to the unit.

| Additive | Level (%) | TOS (h) | Gas Flow (l/h) | NO (nppm) | NO Reduction (%) |
|---|---|---|---|---|---|
| ECAT | | | 888 | 32 | |
| CP-3, CPS | 0.25 | 1 | 889 | 156 | |
| Additive A | 10 | 4 | 906 | 63 | 60 |
| ECAT | | | 886 | 49 | |
| CP-3, CPS | 0.25 | 1.3 | 884 | 148 | |
| Additive B | 10 | 4 | 917 | 56 | 62 |
| ECAT | | | 864 | 27 | |
| CP-3, CPS | 0.25 | 1.3 | 877 | 124 | |
| Additive C | 10 | 4 | 912 | 81 | 35 |
| ECAT | | | 887 | 19 | |
| CP-3, CPS | 0.25 | 1.2 | 877 | 125 | |
| Additive D | 10 | 4 | 913 | 97 | 22 |
| ECAT | | | 878 | 39 | |
| CP-3, CPS | 0.25 | 1.4 | 872 | 152 | |
| Additive E | 10 | 4 | 864 | 109 | 28 |

TABLE 5

Activity of the cracking catalyst inventory and product yields during testing of zeolite based additives in the DCR.

| Catalyst Name | ECAT Average of 6 runs | ECAT w/ 0.25% Pt Prom. 10% Additive A | ECAT w/ 0.25% Pt Prom. 10% Additive B | ECAT w/ 0.25% Pt Prom. 10% Additive C | ECAT w/ 0.25% Pt Prom. 10% Additive D | ECAT w/ 0.25% Pt Prom. 10% Additive E |
|---|---|---|---|---|---|---|
| Conversion wt % | 71.07 | 69.53 | 70.92 | 71.09 | 71.20 | 70.38 |
| C/O RATIO | 8.19 | 7.87 | 8.08 | 8.19 | 7.85 | 8.11 |
| H2 Yield wt % | 0.05 | 0.05 | 0.05 | 0.05 | 0.05 | 0.05 |
| C1 + C2's wt % | 1.61 | 1.70 | 1.79 | 1.79 | 1.73 | 1.63 |
| Total C3 wt % | 5.50 | 6.11 | 6.48 | 6.23 | 5.99 | 5.84 |
| C3 = wt % | 4.74 | 5.08 | 5.36 | 5.09 | 4.98 | 5.01 |
| Total C4 wt % | 10.03 | 9.92 | 10.56 | 10.47 | 10.35 | 10.14 |
| iC4 wt % | 3.55 | 3.65 | 4.02 | 3.78 | 3.80 | 3.61 |
| Total C4 = wt % | 5.88 | 5.59 | 5.80 | 5.98 | 5.80 | 5.92 |
| iC4 = wt % | 1.63 | 1.74 | 1.80 | 1.79 | 1.67 | 1.77 |
| GASOLINE wt % | 50.95 | 48.80 | 48.69 | 49.49 | 49.93 | 49.74 |
| LCO wt % | 23.84 | 25.12 | 23.94 | 23.64 | 23.70 | 24.37 |
| BOTTOMS wt % | 5.09 | 5.35 | 5.14 | 5.27 | 5.10 | 5.25 |
| Coke wt % | 2.93 | 2.95 | 3.34 | 3.07 | 3.16 | 2.98 |

What is claimed is:

1. A process of reducing $NO_x$ emissions from the regeneration zone during fluid catalytic cracking of a hydrocarbon feedstock into lower molecular weight components, said process comprising
   a) contacting a hydrocarbon feedstock during a fluid catalytic cracking (FCC) process wherein $NO_x$ emissions are released from a regeneration zone of a fluid catalytic cracking unit (FCCU) operating under FCC conditions with a circulating inventory of an FCC cracking catalyst and a particulate $NO_x$ reduction catalyst/additive composition having a mean particle size of greater than 45 μm and comprising (i) at least 10 weight percent of a $NO_x$ reduction zeolite component selected from the group consisting of ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-57, ZSM-61, ZK-5, NO, Nu-87, Cit-1, SSZ-35, SSZ48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Gooseereekite, Natrolite, omega or mixtures thereof, and (ii) from about 5 to about 50 weight percent of an inorganic binder selected from the group consisting of alumina, silica, silica alumina, alumina phosphate and mixtures thereof; and
   b) reducing the amount of $NO_x$ emissions released from the regeneration zone of the FCCU by at least 10% as compared to the amount of $NO_x$ emissions released in the absence of the particulate $NO_x$ reduction composition.

2. The process of claim 1 wherein step (b) is accomplished without a substantial change in the hydrocarbon feedstock conversion or yield of cracked hydrocarbons as compared to the hydrocarbon feedstock conversion or yield of cracked hydrocarbons obtained from the cracking catalyst alone.

3. The process of claim 1 or 2 wherein the $NO_x$ reduction zeolite component is exchanged with a cation selected from the group consisting of hydrogen, ammonium, alkali metal and combinations thereof.

4. The process of claim 1 or 2 wherein the catalyst/additive composition further comprises a matrix material selected from the group consisting of alumina, silica, silica alumina, titania, zirconia, yttria, lanthana, ceria, neodymia, samaria, europia, gadolinia, praseodymia, and mixtures thereof.

5. The process of claim 4 wherein the matrix material is present in an amount less than 70 weight percent.

6. The process of claim 1 or 2 further comprising recovering the cracking catalyst from said contacting step and treating the used catalyst in a regeneration zone to regenerate said catalyst.

7. The process of claim 6 wherein the cracking catalyst and the particulate catalyst/additive composition are fluidized during contacting said hydrocarbon feedstock.

8. The process of claim 1 or 2 further comprising contacting the hydrocarbon feed with at least one additional $NO_x$ reduction composition.

9. The process of claim 8 wherein the additional $NO_x$ reduction composition is a non-zeolitic composition.

10. The process of claim 9 wherein the additional $NO_x$ reduction composition comprises (1) an acidic metal oxide containing substantially no zeolite; (2) a metal component, measured as the oxide, selected from the group consisting of an alkali metal, an alkaline earth metal and mixtures thereof; (3) an oxygen storage metal oxide component; and (4) at least one noble metal component.

11. The process of claim 8 wherein the additional $NO_x$ reduction composition is a low $NO_x$ CO combustion promoter composition which comprises (1) an acidic oxide support; (2) an alkali metal and/or alkaline earth metal or mixtures thereof; (3) a transition metal oxide having oxygen storage capability; and (4) palladium.

12. The process of claim 8 wherein the additional $NO_x$ reduction composition comprises (1) an acidic oxide support; (2) an alkali metal and/or alkaline earth metal or mixtures thereof; (3) a transition metal oxide having oxygen storage capability; and (4) a transition metal selected from Groups 1B and IIB of the Periodic Table, and mixtures thereof.

13. The process of claim 8 wherein the additional $NO_x$ reduction composition comprises at least one metal-containing spinel which includes a first metal and a second metal having a valence higher than the valence of said first metal, at least one component of a third metal other than said first and second metals and at least one component of a fourth metal other than said first, second and third metals, wherein said third metal is selected from the group consisting of Group IB metals, Group IIB metals, Group VIA metals, the rare-earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof.

14. The process of claim 13 wherein the metal containing spinel comprises magnesium as said first metal and aluminum as said second metal.

15. The process of claim 13 wherein the third metal component in the metal containing spinel is selected from the group consisting of a Platinum Group metal, the rare-earth metals and mixtures thereof.

16. The process of claim 13 wherein the third metal component is present in an amount in the range of about 0.001 to about 20 weight percent, calculated as elemental third metal.

17. The process of claim 13 wherein said fourth metal component is present in an amount in the range of about 0.001 to about 10 weight percent, calculated as elemental fourth metal.

18. The process of claim 8 wherein the additional $NO_x$ reduction composition is a zinc based catalyst.

19. The process of claim 8 wherein the additional $NO_x$ reduction composition is an antimony based $NO_x$ reduction additive.

20. The process of claim 8 wherein the additional $NO_x$ reduction composition is a perovskite-spinel $NO_x$ reduction additive.

21. The process of claim 8 wherein the additional $NO_x$ reduction composition is a hydrotalcite containing composition.

22. The process of claim 8 wherein the additional $NO_x$ reduction composition comprises (i) an acidic metal oxide, (ii) cerium oxide, (iii) a lanthanide oxide other than ceria, and (iv) optionally, at least one oxide of a transition metal selected from Groups IB and IIB of the Periodic Table, noble metals and mixtures thereof.

23. The process of claim 1 or 2 wherein the particulate $NO_x$ reduction catalyst/additive composition has a Davison attrition index (DI) value of less than 50.

24. The process of claim 23 wherein the particulate $NO_x$ reduction catalyst/additive composition has a DI value of less than 20.

25. The process of claim 24 wherein the particulate $NO_x$ reduction catalyst/additive composition has a DI value of less than 15.

26. The process of claim 1 wherein the FCC cracking catalyst comprises a Y-type zeolite.

27. The process of claim 26 wherein the amount of the catalyst/additive composition in the catalyst inventory is that amount sufficient to provide a ratio of $NO_x$ reduction zeolite component to Y-type zeolite in the total catalyst inventory of less than 2.

28. The process of claim 27 wherein the ratio of $NO_x$ reduction zeolite component to Y-type zeolite in the total catalyst inventory is less than 1.

29. The process of claim 26 wherein step (b) is accomplished without a substantial change in the hydrocarbon feedstock conversion or yield of cracked hydrocarbons as compared to the hydrocarbon feedstock conversion or yield of cracked hydrocarbons obtained from the cracking catalyst alone.

30. The process of claim 1 wherein the amount of the $NO_x$ reduction zeolite component present in the catalyst/additive composition is at least 30 weight percent of the composition.

31. The process of claim 30 wherein the amount of the $NO_x$ reduction zeolite component present in the catalyst/additive composition is at least 40 weight percent of the composition.

32. The process of claim 31 wherein the amount of the $NO_x$ reduction zeolite component present in the catalyst/additive composition is at least 50 weight percent of the composition.

33. The process of claim 1 wherein the amount of the $NO_x$ reduction zeolite component present in the catalyst/additive composition ranges from about 10 to about 85 weight percent of the composition.

34. The process of claim 33 wherein the amount of the $NO_x$ reduction zeolite component present in the catalyst/additive composition ranges from about 30 to about 80 weight percent of the composition.

35. The process of claim 34 wherein the amount of the $NO_x$ reduction zeolite component present in the catalyst/additive composition ranges from about 40 to about 75 weight percent of the composition.

36. The process of claim 1 wherein the $NO_x$ reduction zeolite component further comprises at least one stabilizing metal.

37. The process of claim 36 wherein the stabilizing metal is a metal selected from the group consisting of Groups 2A, 3B, 4B, 5B, 6B, 7B, 8B, 2B, 3A, 4A, 5A, and the Lanthanide Series of The Periodic Table, Ag and mixtures thereof.

38. The process of claim 37 wherein the stabilizing metal is selected from the group consisting of Groups 3B, 2A, 2B, 3A and the Lanthanide Series of the Periodic Table, and mixtures thereof.

39. The process of claim 38 wherein the stabilizing metal is selected from the group consisting of lanthanum, aluminum, magnesium, zinc, and mixtures thereof.

40. The process of claim 36 wherein the stabilizing metal is incorporated into the pores of the $NO_x$ reduction zeolite component.

41. The process of claim 1 wherein the inorganic binder is selected from the group consisting of silica, alumina, silica alumina and mixtures thereof.

42. The process of claim 41 wherein the inorganic binder is alumina.

43. The process of claim 42 wherein the alumina is an acid or base peptized alumina.

44. The process of claim 42 wherein the alumina is aluminum chlorohydrol.

45. The process of claim 1 wherein the amount of inorganic binder present in the particulate catalyst/additive composition ranges from about 10 to about 30 weight percent of the composition.

46. The process of claim 45 wherein the amount of inorganic binder present in the particulate catalyst/additive composition ranges from about 15 to about 25 weight percent of the composition.

47. The process of claim 1 wherein the $NO_x$ reduction zeolite component has a $SiO_2$ to $Al_2O_3$ molar ratio of less than 500.

48. The process of claim 1 wherein the $NO_x$ reduction zeolite component is a zeolite selected from the group consisting of beta, MCM-49, mordenite, MCM-56, Zeolite-L, zeolite Rho, errionite, chabazite, clinoptilolite, MCM-22, Offretite, A, ZSM-12, ZSM-23, omega and mixtures thereof.

49. The process of claim 1 wherein the particulate catalyst/additive composition further comprises an additional zeolite other than the $NO_x$ reduction zeolite.

50. The process of claim 49 wherein the additional zeolite is selected from the group consisting of ferrierite, ZSM-5, ZSM-35 and mixtures thereof.

51. The process of claim 49 or 50 wherein the additional zeolite is present in an amount ranging from about 1 to about 80 weight percent of the composition.

52. The process of claim 51 wherein the additional zeolite is present in an amount ranging from about 10 to about 70 weight percent of the composition.

53. The process of claim 1 wherein the particulate $NO_x$ reduction catalyst/additive composition has a mean particle size from about 50 to about 200 μm.

54. The process of claim 53 wherein the particulate $NO_x$ reduction catalyst/additive composition has a mean particle size from about 55 to about 150 μm.

* * * * *

UNITED STATES PATENT AND TRADEMARK OFFICE
CERTIFICATE OF CORRECTION

| | | |
|---|---|---|
| PATENT NO. | : 7,641,787 B2 | Page 1 of 1 |
| APPLICATION NO. | : 12/291379 | |
| DATED | : January 5, 2010 | |
| INVENTOR(S) | : George Yaluris, Michael Scott Ziebarth and Xinjin Zhao | |

It is certified that error appears in the above-identified patent and that said Letters Patent is hereby corrected as shown below:

In Claim 1, Col. 17, line 26, delete "alumina phosphate" and insert --aluminum phosphate--.

Signed and Sealed this
Thirty-first Day of May, 2011

David J. Kappos
*Director of the United States Patent and Trademark Office*